3,442,669
GRAPHITE BEARING HIGH MgO MORTAR
Carl E. Osterholtz, Bethlehem, Pa., assignor to Bethlehem
 Steel Corporation, a corporation of Delaware
No Drawing. Filed Aug. 16, 1966, Ser. No. 572,673
Int. Cl. C04b *35/52, 35/20*
U.S. Cl. 106—56                                                    6 Claims

ABSTRACT OF THE DISCLOSURE

This invention is directed to a basic refractory mortar containing not less than 75% magnesia and 5% to 20% graphite which is not less than 60% carbon for use in forming a seal between the snorkel and throat section in a vacuum vessel. All the particles of the mix will pass a 35 mesh screen while 75% of the magnesia particles will pass a 200 mesh screen and 90% of the graphite particles will pass 65 mesh screen. The mortar will remain plastic at elevated temperatures.

---

This invention relates to a basic refractory mortar which may be used in laying up refractory brick in vacuum apparatus for processing molten metal, e.g., steel.

Certain types of vacuum apparatus are equipped with a snorkel (a refractory-lined tube) or snorkels which extend downwardly from the vacuum vessel to the molten metal in a ladle or a furnace. The molten metal is forced upwardly into the vacuum vessel from the ladle or furnace and is discharged downwardly (a) through the same single snorkel in one type of apparatus or (b) through a second snorkel extending downwardly in parallel relationship to the first snorkel in another type of apparatus. In each type of apparatus, the snorkel is attached to the underside of the vacuum vessel, the point of juncture being called the throat flange or the upper leg flange.

It is imperative that the seal between the snorkel and the vacuum vessel at the throat flange be both air and liquid tight to maintain the vacuum inside the vacuum vessel and to prevent leakage of molten metal through the joint between the snorkel and vacuum vessel in their movements during the vacuum operation. In an effort to assure a tight seal, a course of specially shaped refractory brick may be incorporated at the point of juncture of the vacuum vessel and the snorkel. The brick may be laid up with a basic refractory mortar which may be either air- or heat-setting but is usually air-setting. In any event the basic refractory mortar which is used dries out at the high temperature prevalent in the vacuum vessel as the snorkel is being "pulled-up" to make the tight seal. The mortar loses its plasticity and becomes hard and brittle. As a result incipient cracks are formed in the mortar which may allow the molten metal to penetrate the seal and cause early failure of the refractory lining at the throat flange.

It is therefore the object of this invention to provide an improved basic refractory mortar which has good trowelling characteristics, has a residual plasticity at high temperatures, adheres to the shapes it is to hold in place, has good refractory properties at elevated temperatures and is resistant to slags, molten metal, and fumes present in the vacuum vessel.

Broadly my invention includes making a basic refractory mortar mix of high purity magnesia and a high temperature lubricant to lay up the brick and form a seal in the throat section of the vacuum vessel.

In a more detailed description of the mortar of this invention, refractory mix is made on a weight basis of dry solids and will contain at least 75% dead-burned magnesite and from about 5% to 20% graphite which is at least 80% carbon, the remaining constituents of the mortar being incidental impurities usually associated with magnesia and graphite. Dead-burned magnesite is magnesite which has been fired to convert substantially all the magnesium carbonate ($MgCO_3$) to magnesia (MgO) which is suitable for refractory purposes. Firing the magnesite does not remove impurities such as lime, silica, iron oxide, alumina. The resultant dead-burned refractory mix may contain 60% magnesia by weight, up to about 5.00% lime by weight, up to about 8.00% silica by weight, up to about 10.00% iron oxide by weight, and up to about 2.00% alumina by weight. It is preferred to use a basic refractory mix which is about 90% magnesia, the remainder being the aforementioned incidental impurities. The magnesia grains and graphite particles should have a size of a fineness such that substantially all the grains and particles will pass a 35 mesh screen (Tyler Sieve Size). The refractory mix may contain magnesia grains of a fineness such that at least 75% will pass a 200 mesh screen (Tyler Sieve Size) and graphite particles of a fineness such that at least 90% will pass a 65 mesh screen (Tyler Sieve Size). The refractory mix may have a binder such as sodium silicate added thereto but the addition of a binder is not essential to the invention.

When it is desired to attach the snorkel of the vacuum apparatus to the vacuum vessel, a layer of the subject refractory mortar not less than 5/64 inch in thickness is laid on the top course of refractory shape in the snorkel. The snorkel is then raised into position and bolted to the bottom of the vaccum vessel. Although the operating temperature in the vacuum vessel may be as high as 2900° F., the mortar of the invention will not "set" into a hard brittle layer but will retain a degree of its original plasticity. When the snorkel is drawn-up tight by means of bolts extending through slots in the metal flange in the top of the snorkel and extending upwardly into companion holes in the throat flange of the vessel, the mortar will give since it is resilient. Incipient cracking will not occur when the aforesaid bolts are "pulled-up" to form the tight joint. The mortar retains sufficient plasticity without the formation of a glassy phase during the operation of the vacuum vessel to prevent cracking. Therefore, the mortar will yield under the stress induced by the thermal expansion of the refractories in the throat of the vessel and by the flow of molten metal through the snorkel. As a result, attrition of the refractory brick is kept at a minimum. Since the brick will remain intact and the mortar will resist cracking, a tight seal is assured at the throat of the vacuum vessel. An efficient, safe and longer service life than normal is thus realized in the snorkel and vacuum vessel linings.

In a specific example of the invention, 50 pounds of a high purity magnesia having a chemical composition of 90% MgO, 4% $SiO_2$, 1% $Al_2O_3$, 1% CaO, 1% $Fe_2O_3$, by weight, the remainder incidental impurities, was dry mixed with 6 pounds of graphite which analyzed 90% carbon. A screen analysis of the magnesia showed that substantially all the grains passed a 35 mesh screen (Tyler Sieve Size) while 25% remained on a 200 mesh screen (Tyler Seive Size). A screen analysis of the graphite showed that about 90% passed a 65 mesh screen (Tyler Sieve Size).

In order to make a refractory mortar having good trowelling characteristics, the dry mortar was mixed with two gallons of water. The mortar mix was trowelled onto the upper surface of the uppermost layer of brick in the snorkel while the snorkel was detached from the vacuum vessel to form a layer 1/8" thick. The snorkel was raised into position and was drawn up to the underside of the vacuum vessel. A tight seal was formed. Although the vacuum vessel was at operating temperature of 2800° F., the mortar did not crack nor chip when the water evaporated therefrom during the attaching operation. The vacuum vessel was used to process 84 heats. The snorkel was removed and replaced 6 times for vessel maintenance and showed no signs of lining or throat failure.

In another example, the mortar of the invention was used to make the throat to snorkel seal on a 200 ton vacuum vessel. The mortar was mixed on a volume basis of 25% graphite, the balance being conventional 94% MgO air-setting high magnesia mortar. On a weight basis, the mortar was 15% graphite and 85% high magnesia air-setting mortar. A screen analysis of the magnesia showed that substantially all the grains passed a 35 mesh screen (Tyler Sieve) while 20% remained on a 200 mesh screen (Tyler Sieve). A screen analysis of the graphite showed that 92% passed a 65 mesh screen (Tyler Sieve). Water was added to the mortar to produce trowelling consistency. The throat to snorkel seal was made cold as described in the first example. The vessel was used to produce 152 heats at which time the side walls of the vessel required repairs. No evidence of hot metal penetration of the seal was found indicating the seal had been effective and was still serviceable.

While I have given specific examples of my invention and have clearly and concisely pointed out its advantages, it will be understood that modifications may be made which come within the scope of the claims.

I claim:

1. A basic refractory mortar for lying up refractory brick consisting principally of magnesia grains and graphite particles, the magnesia being not less than 75% by weight, the graphite being present in an amount of from 5% to 20% by weight, the remainder incidental impurities, said grains of magnesia and said graphite particles being of a fineness such that substantially all will pass a 35 mesh Tyler Sieve.

2. A basic refractory mortar as claimed in claim 1 consisting essentially of 15% by weight graphite particles, the remainder magnesia grains containing not less than 90% magnesia and incidental impurities.

3. A basic refractory mortar as claimed in claim 1 in which substantially all the magnesia grains will pass a 35 mesh Tyler Sieve and about 75% will pass a 200 mesh Tyler Sieve.

4. A basic refractory mortar as claimed in claim 1 in which substantially all the graphite particles will pass a 35 mesh Tyler Sieve and about 90% will pass a 65 mesh Tyler Sieve.

5. A basic refractory mortar as claimed in claim 2 in which substantially all the magnesia grains will pass a 35 mesh Tyler Sieve and about 75% will pass a 200 mesh Tyler Sieve.

6. A basic refractory mortar as claimed in claim 2 in which substantially all the graphite particles will pass a 35 mesh Tyler Sieve and about 90% will pass a 65 mesh Tyler Sieve.

References Cited

UNITED STATES PATENTS

| | | | |
|---|---|---|---|
| 1,303,993 | 5/1919 | Tone. | |
| 1,674,961 | 6/1928 | Diamond | 106—56 |
| 2,688,562 | 9/1954 | West et al. | |

JAMES E. POER, *Primary Examiner.*

U.S. Cl X.R.

106—58